Nov. 21, 1939.  F. C. LEONARD  2,180,362
MANUFACTURE OF THERMOSTATIC MIXING VALVES
Original Filed March 14, 1934  3 Sheets-Sheet 1

Inventor
Frederick C. Leonard
By Nathaniel Frucht
his Attorney

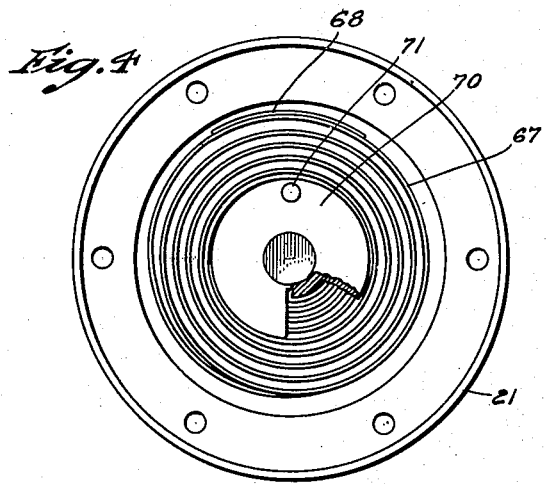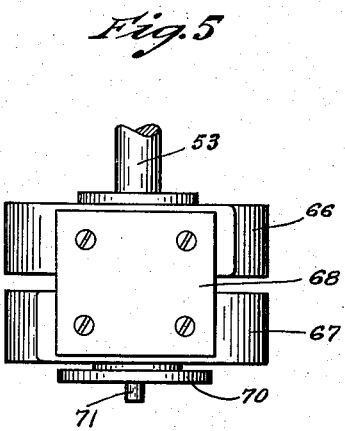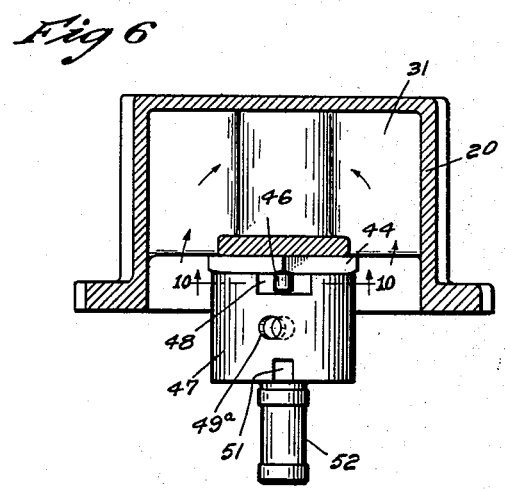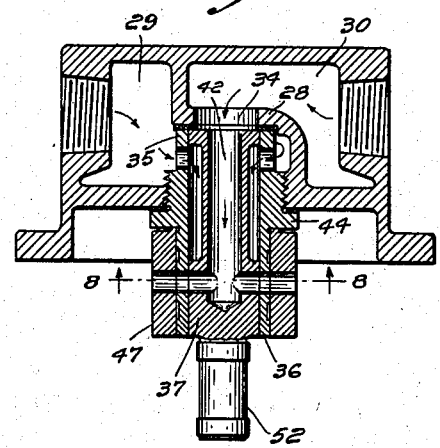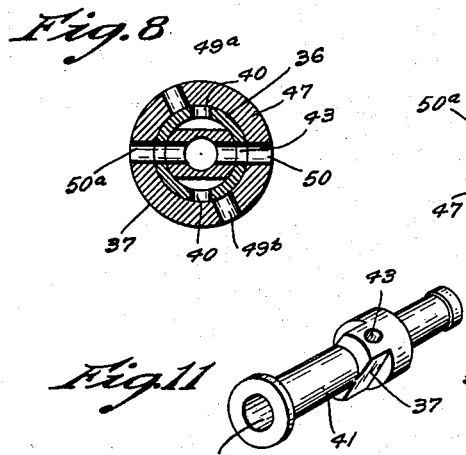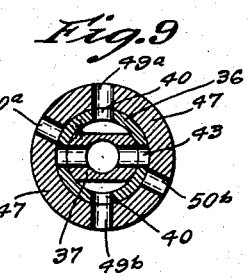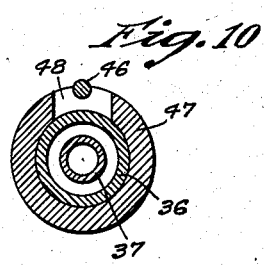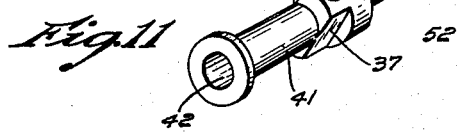

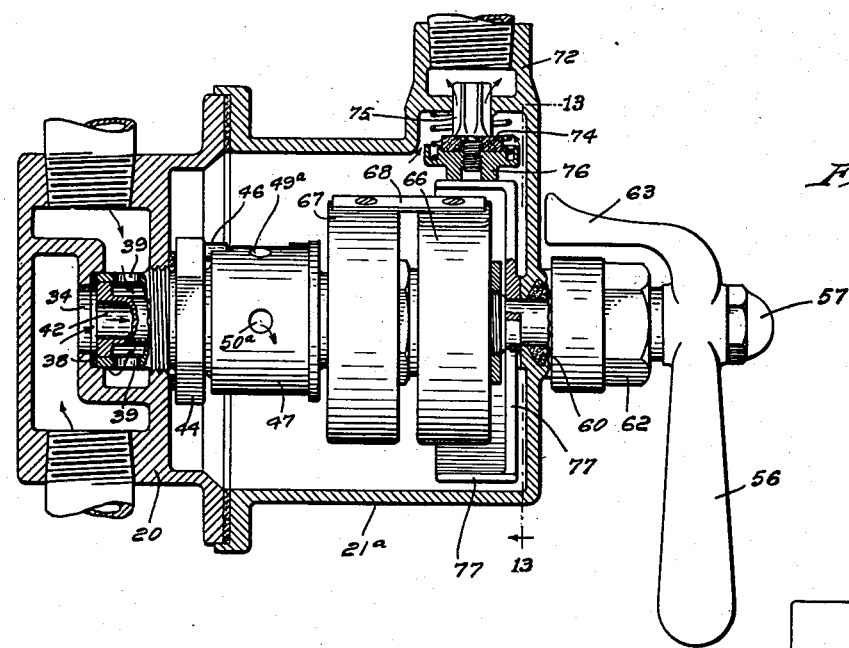

Patented Nov. 21, 1939

2,180,362

UNITED STATES PATENT OFFICE 2,180,362

MANUFACTURE OF THERMOSTATIC MIXING VALVES

Frederick C. Leonard, Cranston, R. I.

Refiled for abandoned application Serial No. 715,430, March 14, 1934. This application October 25, 1937, Serial No. 170,818

8 Claims. (Cl. 236—12)

This application is a refiling of my application Serial No. 715,430, filed March 14, 1934, and now abandoned, entitled Manufacture of thermostatic mixing valves.

My present invention relates to mixing valves for controlling the mixing of fluids of different temperatures, and has particular reference to thermostatic controls therefor.

The control of inflows of fluids of different temperatures such as hot and cold water, or steam and cold water, for obtaining a mixed fluid of definite temperature has been effected by means of reciprocating, sliding, and rotary valves. Since a maximum range of thermostatic movement for a given temperature change is obtained by using thermostatic coils, it is desirable to use a rotary valve, as the arcuate movement of a thermostatic coil may then be directly transmitted to the valve. The principal object of my invention is to simplify the construction and operation of the valve and its control mechanism, in order to increase the accuracy of the flow control regulation.

Further objects of the invention are to provide a closure for the mixed fluid outflow which is operated by movement of the temperature control, or alternately, closures for the inflows of the fluids to be mixed.

With the above and other objects and advantageous features in view, the invention consists of a novel arrangement of parts more fully disclosed in the detailed description following, in conjunction with the accompanying drawings, and more specifically defined in the claims appended thereto.

In the drawings:

Fig. 4 is a rear view of the upper section;

Fig. 5 is an elevation of the thermostatic element;

Fig. 6 is a section on the line 6—6 of Fig. 3;

Fig. 7 is a section on the line 7—7 of Fig. 3;

Fig. 8 is a section on the line 8—8 of Fig. 7;

Fig. 9 is a view similar to Fig. 8, but showing a different valve position;

Fig. 10 is a section on the line 10—10 of Fig. 6;

Fig. 11 is a perspective view of the inlet plug;

Fig. 12 is a sectional view showing a modified valve arrangement;

Fig. 13 is a section on the line 13—13 of Fig. 12;

Fig. 14 is a sectional view of another modified form;

Fig. 15 is a section on the line 15—15 of Fig. 14; and

Fig. 16 is a section on the line 16—16 of Fig. 14.

Figure 1:
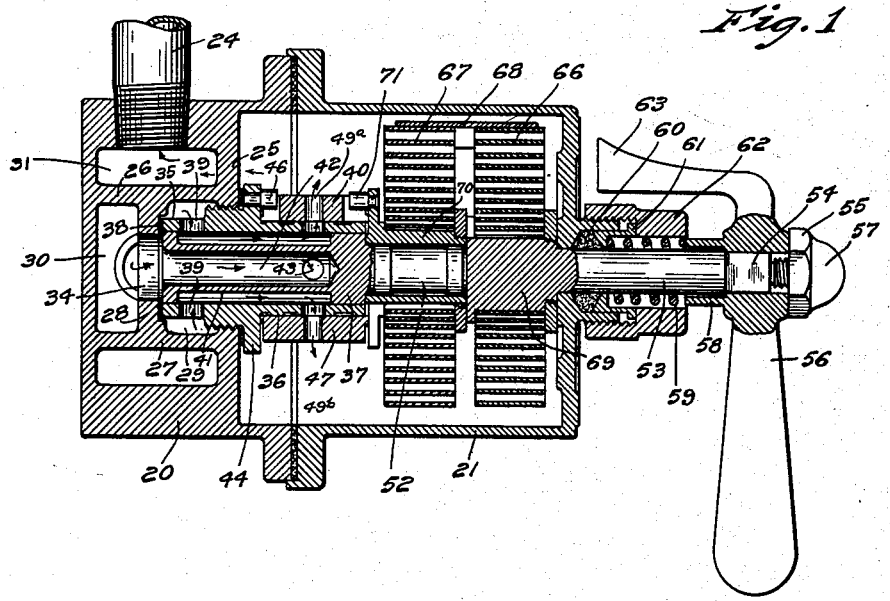
Fig. 1 is a central vertical section through the novel valve.
Figure 2:
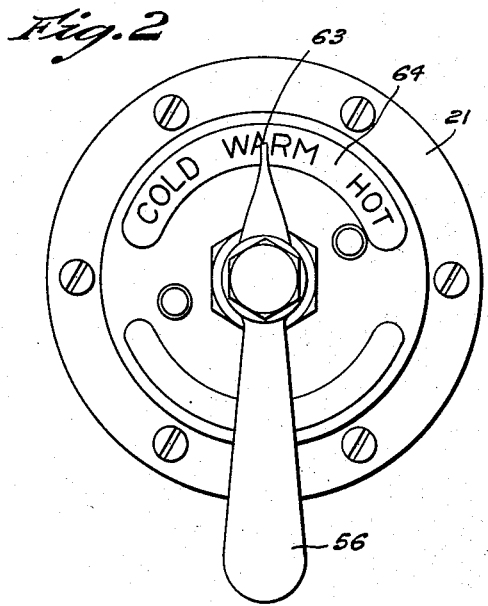
Fig. 2 is an elevation of the front thereof.
Figure 3:
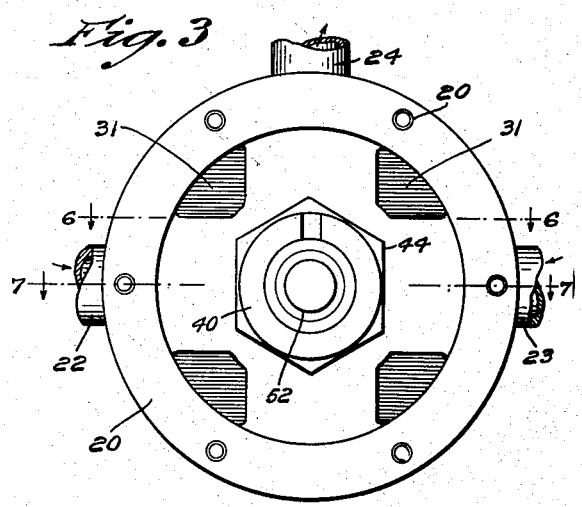
Fig. 3 is a front view of the base setting.

Referring to the drawings, the improved thermostatic valve includes a base section 20 and an upper section 21, the base section receiving the inlet conduits 22, 23 for the fluids of different temperature, for example hot and cold water, and the outlet conduit 24 for the mixed fluid of predetermined temperature, and housing the valve mechanism, and the upper section carrying the control mechanism. Packing of standard type is provided between the sections.

As shown in Figs. 1, 6 and 7, the base section has a series of partitions 25, 26, 27 and 28, which divide the base section into an inlet chamber 29 for hot water, an inlet chamber 30 for cold water, and an outlet chamber 31 for the mixed fluid, the partition 25 having an opening 32, see Fig. 6, leading to the outlet chamber, and the irregular partition 28, see Fig. 7, having an opening 33 for outflow of hot water and an opening 34 for outflow of cold water.

The partition 25 has a central threaded opening 35 for threadedly receiving a tubular shell 36 in which a flow plug 37 is snugly received, a packing 38 being positioned between the shell and the partition 28. As shown in Figs. 1 and 7, the shell has inlets 39 and outlets 40 for the hot water, the reduced section 41 of the plug providing an annular passageway between the inlets and outlets in conjunction with the inner surface of the shell. The inlets 39 and the outlets 40 are both two in number, spaced 180 degrees apart.

The inner bore 42 of the plug receives the cold water from the passage 34 and has an enlarged end with outlets 43 in the same plane as outlets 40 but spaced therebetween. The shell has a hexagonal flange 44, with packing 45 between the flange and the partition 25, in which a stop pin 46 is set, to limit rotative movement of the sleeve valve 47, the base of the sleeve valve having a slot 48 in which the stop pin is received, and the walls of the sleeve valve having outlet openings 49a and 49b, 50a and 50b, for respective aligning with the outlets 40 and 43. The sleeve valve has a slot 51 in its upper wall for receiving an actuating pin, and the plug 37 has a head 52 adapted to form a seat for the actuating pin carrier, as hereinafter described.

Referring now Figs. 1, 2, 4 and 5, the upper section 21 has a control stem 53 extending therethrough, and terminating in a square section 54 and a threaded end 55, a handle 56 having a square bore being mounted on the section 54, and locked in place by a nut 57 which is threaded on the end 55. The handle has a depending flange 58 which is resiliently pressed outwardly by a spring 59 to retain the setting; a gland packing 60 having the usual follower 61 and nut 62 is provided for the stem 53. The handle has a pointer 63 which cooperates with a scale 64 on the face of the upper section.

A thermostatic unit 65 is housed in the upper section, and preferably includes two coils 66, 67, joined by a plate 68; the upper coil 66 is secured to the enlarged base 69 of the stem 53, as indicated in Fig. 1; and the lower coil is secured to a pin carrier 70 rotatably mounted on the head 52 of the flow plug, which carries an actuating pin 71 engaging the sleeve valve.

The above described construction is simple to manufacture, and is readily assembled and repaired; the regulation is very accurate, within close limits. It is necessary, however, to utilize separate shut-off valves; the construction may be modified, however, to either shut off the outflow, or the hot and cold fluid inflows.

Thus, referring to Figs. 12 and 13, the outflow 72 is positioned in the upper section 21a, and includes a port 73 controlled by a check valve 74, normally spring pressed to open position by a spring 75, and having its head 76 contacting a cam 77, see Fig. 13, which is secured to the control stem 53a in any suitable manner; if the handle 56 is rotated to bring the pointer 63 to the extreme left, the cam will close the valve 74.

Instead of controlling the outflow, the two inflows may be controlled, as indicated in Figs. 14, 15 and 16. In this construction, the base section 78 has two inlet openings 79, 80 for the hot and cold fluid, and partition 81, 82 to provide inlet chambers 83, 84 and outflow ports 85, 86. A central plug 87 is secured to a sleeve 88, and has a bore 89 and an end closure 90 which is adapted to function as a shut-off for the port 85, the closure having passageways 91 leading to the bore, which has outlet openings 92 in an enlarged section contacting the sleeve 88. The plug is smaller in diameter than the sleeve to provide passageways 93 for the cold fluid from the ports 86, to the outlet ports 94 in the sleeve; a flange 95 on the plug is adapted to close the ports 86 upon downward movement of the plug. The sleeve is threaded at its lower end 96 to engage the base section wall 97, whereby rotative movement of the sleeve moves the sleeve and the plug to open and shut the inflow openings.

The sleeve has a flange 98 in which a limit stop pin 99 is mounted to limit movement of the sleeve valve 100, which controls the outflow ports 92 and 94 as in the previous constructions, in response to movement of the thermostatic unit 101. The control stem 102 has a terminal reduced end 103 with a pin 104 projecting therefrom, which seats in a bore 105 in the head 106 of the sleeve, the wall 107 of the bore being cut away as indicated in Fig. 16 to produce a delayed movement of the sleeve upon rotation of the handle. The extreme movement of the handle to the right thus shuts the inlets, and the thermostatic unit controls the relative inflow of the two fluids while the inlets are open.

The improved valve construction thus utilizes inexpensive parts which may be readily assembled and repaired, and exercises an accurate control over the inflow of the hot and cold fluids; in addition, the valve may be modified so as to completely shut-off the outflow and alternately to shut-off the inflow of both the hot and cold fluid, thus providing a unitary arrangement which functions both as a thermostatically controlled regulatory valve and a shut-off valve.

While I have described a specific structural arrangement, that is a preferred embodiment of my invention, it is obvious that desired changes in the proportion, in the relative arrangement, in the material, and the function of the parts may be made to suit the requirements for particular installations, within the spirit and the scope of the invention as defined in the appended claims.

I claim:

1. In a mixing valve, a housing having an inlet chamber for hot fluid, an inlet chamber for cold fluid, and an outlet chamber for mixed fluid, a member having a bore communicating with one inlet chamber, a sleeve spaced from said member, the space between said sleeve and said member communicating with the other inlet chamber, said member and said sleeve having outflow openings for said bore and said space, a sleeve valve device mounted on said sleeve and movable to control outflow from said openings, a thermostatic chamber in communication with said outflow openings and said outlet chamber, and thermostatic means in said thermostatic chamber responsive to change in temperature of the fluid therein to move said valve device.

2. In a mixing valve, a housing having an inlet chamber for hot fluid, an inlet chamber for cold fluid, and an outlet chamber for mixed fluid, a member having a bore communicating with one inlet chamber, a sleeve spaced from said member, the space between said sleeve and said member communicating with the other inlet chamber, said member and said sleeve having outflow openings for said bore and said space, a sleeve valve device mounted on said sleeve and movable to control outflow from said openings, a thermostatic chamber in communication with said outflow openings and said outlet chamber, thermostatic means in said thermostatic chamber responsive to change in temperture of the mixed fluid therein to move said valve device, and means for setting said thermostatic means to obtain a predetermined temperature of the mixed fluid.

3. In a mixing valve, a housing having an inlet chamber for hot fluid, an inlet chamber for cold fluid, and an outlet chamber for mixed fluid, a member having a bore communicating with one inlet chamber, a sleeve spaced from said member, the space between said sleeve and said member communicating with the other inlet chamber, said member and said sleeve having outflow openings for said bore and said space, a sleeve valve device mounted on said sleeve and movable to control outflow from said openings, a thermostatic chamber in communication with said outflow openings and with said outlet chamber, means responsive to manual actuation of said valve device to shut off flow from said mixing chamber to said thermostatic chamber, and thermostatic means in said thermostatic chamber responsive to changes in temperature of the fluid therein to move said valve device.

4. In a mixing valve, a housing having an inlet chamber for hot fluid, an inlet chamber for cold fluid, and an outlet chamber for mixed fluid, a member having a bore communicating with one inlet chamber, a sleeve spaced from said member, the space between said sleeve and said member communicating with the other inlet chamber, said member and said sleeve having outflow openings for said bore and said space, a sleeve valve device on said sleeve and movable to control outflow from said openings, a thermostatic chamber in communication with said outflow openings and with said outlet chamber, means responsive to manual actuation of said valve device to shut off flow from said mixing chamber to said thermostatic chamber, thermostatic means in said thermostatic chamber responsive to change in temperature of the fluid therein to move said valve device, and means for setting said thermostatic means to obtain a predetermined temperature of the mixed fluid.

5. In a mixing valve, a housing having an inlet chamber for hot fluid, an inlet chamber for cold fluid, and an outlet chamber for mixed fluid, a member having a bore communicating with one inlet chamber, a sleeve spaced from said member, the space between said sleeve and said member communicating with the other inlet chamber, said member and said sleeve having outflow openings for said bore and said space, a sleeve valve device on said sleeve and movable to control outflow from said openings, a thermostatic chamber in communication with said outflow openings and with said outlet chamber, means responsive to manual actuation of said valve device to shut off flow through the hot fluid outflow opening, and thermostatic means in said thermostatic chamber responsive to changes in temperature of the fluid therein to move said valve device.

6. In a mixing valve, a housing having an inlet chamber for hot fluid, an inlet chamber for cold fluid, and an outlet chamber for mixed fluid, a member having a bore communicating with one inlet chamber, a sleeve spaced from said member, the space between said sleeve and said member communicating with the other inlet chamber, said member and said sleeve having outflow openings for said bore and said space, a sleeve valve device mounted on said sleeve and movable to control outflow from said openings, a thermostatic chamber in communication with said outflow openings and with said outlet chamber, means responsive to manual actuation of said valve device to shut off flow through the hot fluid outflow opening, thermostatic means in said thermostatic chamber responsive to changes in temperature of the fluid therein to move said valve device, and means for setting said thermostatic means to obtain a predetermined temperature of the mixed fluid.

7. In a mixing valve, a housing having an inlet chamber for a fluid, a second inlet chamber for a second fluid, and a mixed fluid chamber having an outlet, a sleeve device having a bore and projecting into said first inlet chamber with said bore in communication with said first inlet chamber, said sleeve device having a passageway communicating with said second inlet chamber, and having fluid outlet ports for said bore and said passageway communicating with said mixed fluid chamber, a valve device mounted on said sleeve device and movable to control flow through said fluid outlet ports, and thermostatic means in said mixed fluid chamber responsive to change of the fluid therein to move said valve device.

8. In a mixing valve, a housing having an inlet chamber for cold fluid, a second inlet chamber for hot fluid, and a mixed fluid chamber having an outlet, a sleeve device having a bore and projecting into said cold fluid inlet chamber with said bore in communication with said cold fluid inlet chamber, said sleeve device having a passageway communicating with said hot fluid inlet chamber, and having fluid outlet ports for said bore and said passageway communicating with said mixed fluid chamber, a valve device mounted on said sleeve device and movable to control flow through said fluid outlet ports, and thermostatic means in said mixed fluid chamber responsive to change of the fluid therein to move said valve device.

FREDERICK C. LEONARD.